(12) United States Patent
Williams et al.

(10) Patent No.: US 6,531,216 B1
(45) Date of Patent: Mar. 11, 2003

(54) HEAT SEALABLE COATING FOR MANUAL AND ELECTRONIC MARKING AND PROCESS FOR HEAT SEALING THE IMAGE

(75) Inventors: Scott Williams, Hawley, PA (US); Heather Reid, Hamburg, NJ (US)

(73) Assignee: Foto-Wear, Inc., Milford, PA (US)

( * ) Notice: Subject to any disclaimer, the term of this patent is extended or adjusted under 35 U.S.C. 154(b) by 0 days.

(21) Appl. No.: 09/547,760

(22) Filed: Apr. 12, 2000

Related U.S. Application Data (60) Provisional application No. 60/129,366, filed on Apr. 15, 1999.

(51) Int. Cl.$^7$ ................................................. B32B 7/12
(52) U.S. Cl. ................. 428/347; 428/317.1; 428/317.7; 428/319.3; 428/319.7; 428/348; 428/349; 427/146; 427/148
(58) Field of Search ............................ 428/317.1, 317.7, 428/319.3, 319.7, 347, 348, 349; 427/146, 148

(56) References Cited

U.S. PATENT DOCUMENTS

| | | | |
|---|---|---|---|
| 3,222,419 A | 12/1965 | Jubilee et al. | |
| 3,257,478 A | 6/1966 | Jubilee et al. | |
| 3,658,570 A | 4/1972 | Crooks et al. | |
| 3,936,542 A | 2/1976 | Cox | |
| 4,021,591 A | 5/1977 | DeVries et al. | |
| 4,117,182 A | * 9/1978 | Andrews | 428/201 |
| 4,189,395 A | 2/1980 | Bland | |
| 4,235,657 A | 11/1980 | Greenman et al. | |
| 4,284,456 A | 8/1981 | Hare | |
| 4,337,289 A | 6/1982 | Reed et al. | |
| 4,351,871 A | 9/1982 | Lewis et al. | |
| 4,477,622 A | 10/1984 | Sanderson et al. | |
| 4,555,436 A | 11/1985 | Geurtsen et al. | |
| 4,726,979 A | 2/1988 | Chapman | |
| 4,731,268 A | * 3/1988 | Murray, Jr. et al. | 428/35 |
| 4,773,953 A | 9/1988 | Hare | |
| 4,863,781 A | 9/1989 | Kronzer | |

(List continued on next page.)

FOREIGN PATENT DOCUMENTS

| | | |
|---|---|---|
| EP | 0728801 A2 | 8/1996 |
| EP | 0820874 A1 | 1/1998 |
| GB | 2202641 A | 9/1988 |
| WO | WO9321561 | 10/1993 |
| WO | WO9718090 | 5/1997 |
| WO | WO9820393 | 5/1998 |
| WO | WO9821398 | 5/1998 |

OTHER PUBLICATIONS

English abstract of JP 59210978 (Nov. 29, 1984).
English abstract of JP 8324106 (Dec. 10, 1996).
English abstract of JP 2147291 (Jun. 6, 1990).
English abstract of JP 55135853 (Oct. 23, 1980).
English abstract of JP 0948974 (Sep. 22, 1997).
English abstract of JP 11269782 (Oct. 5, 1999).

*Primary Examiner*—Terrel Morris
*Assistant Examiner*—Hai Vo
(74) *Attorney, Agent, or Firm*—Birch, Stewart, Kolasch & Birch, LLP (57) ABSTRACT

The present invention relates to a heat sealable element, which comprises a support, a heat sealing layer comprising a thermoplastic polymer which melts in the range of 50–250° C., a wax which melts in the range of 50–250° C., or combinations thereof, and an image layer which comprises at least one polymer which is capable of selectively receiving and retaining water base colorants. The present invention further relates to a process for heat sealing an image, which comprises imaging the above-mentioned heat sealable element and heating the imaged element in order to melt the imaging layer and heat sealing layer to form substantially a single layer and encapsulating the water base colorant in the single layer.

96 Claims, 1 Drawing Sheet

30

| 3 |
|---|
| 2 |
| 4 |
| 1 |

U.S. PATENT DOCUMENTS

| | | |
|---|---|---|
| 4,869,957 A | 9/1989 | Vankerckhoven et al. |
| 4,956,232 A * | 9/1990 | Balloni et al. ............... 428/349 |
| 4,966,815 A | 10/1990 | Hare |
| 4,980,224 A | 12/1990 | Hare |
| 4,996,096 A * | 2/1991 | Dew .......................... 428/216 |
| 5,019,475 A | 5/1991 | Higashiyama et al. |
| 5,104,719 A | 4/1992 | Kamen et al. |
| 5,139,917 A | 8/1992 | Hare |
| 5,163,247 A | 11/1992 | Weber et al. |
| 5,236,801 A | 8/1993 | Hare |
| 5,242,739 A | 9/1993 | Kronzer et al. |
| 5,242,781 A | 9/1993 | Ohbayashi et al. |
| 5,271,990 A | 12/1993 | Kronzer et al. |
| 5,318,834 A * | 6/1994 | Foulkes et al. .......... 428/304.4 |
| 5,366,837 A | 11/1994 | Sakai |
| 5,370,132 A | 12/1994 | Weber et al. |
| 5,441,056 A | 8/1995 | Weber et al. |
| 5,501,902 A | 3/1996 | Kronzer |
| 5,603,996 A | 2/1997 | Overcash et al. |
| 5,612,168 A | 3/1997 | Ishikawa |
| 5,620,548 A | 4/1997 | Hare |
| 5,665,476 A | 9/1997 | Oez |
| 5,678,247 A | 10/1997 | Vickers |
| 5,741,387 A | 4/1998 | Coleman |
| 5,798,179 A | 8/1998 | Kronzer |
| 5,882,388 A | 3/1999 | Adair et al. |
| 5,925,712 A | 7/1999 | Kronzer |
| 6,036,808 A * | 3/2000 | Shaw-Klein et al. ........ 156/235 |
| 6,124,032 A * | 9/2000 | Bloch et al. ................ 428/346 |

* cited by examiner

HEAT SEALABLE COATING FOR MANUAL AND ELECTRONIC MARKING AND PROCESS FOR HEAT SEALING THE IMAGE

The contents of U.S. Provisional Application No. 60/129,366 filed on Apr. 15, 1999, on which the present application is based and benefit is claimed under 35 U.S.C. 119(e) is herein incorporated by reference.

FIELD OF THE INVENTION

The present invention relates to a heat sealable element which allows direct imaging of a coated support, such as fabric, and a process of self-laminating the element.

BACKGROUND OF THE INVENTION

One method of imaging an element such as a fabric (e.g. tee-shirt) is to write or to draw directly thereon. However, the resulting dye image is not protected from mechanical wear or from water damage.

A second method of imaging an element such as a fabric is to first image a transfer paper, and then transfer the image to the receptor (e.g. fabric) element. The transfer coating provides adhesion to the fabric and protects the fabric from mechanical wear or from water damage.

The present inventors have pursued research to find a product and method which avoids the use of a transfer paper, but at the same time protecting the image on the receptor from the environment.

Transfer papers per se are known in the art in order to permit customers to create their own designs on transfer sheets for application to tee shirts by use of a conventional hand iron, such as described in U.S. Pat. No. 4,244,358 issued Sep. 23, 1980. Furthermore, U.S. Pat. No. 4,773,953 issued Sep. 27, 1988, is directed to a method for utilizing a personal computer, a video camera or the like to create graphics, images, or creative designs on a fabric.

U.S. Pat. No. 5,620,548 is directed to a silver halide photographic transfer element and to a method for transferring an image from the transfer element to a receptor surface. Provisional application No. 60/029,917 discloses that the silver halide light sensitive grains be dispersed within a carrier that functions as a transfer layer, and does not have a separate transfer layer. Provisional application No. 60/056,446 discloses that the silver halide transfer element has a separate transfer layer. Provisional Application No. 60/065,806 relates to a transfer element using CYCOLOR technology, and has a separate transfer layer. Provisional Application No. 60/065,804 relates to a transfer element using thermo-autochrome technology, and has a separate transfer layer. Provisional application No. 60/030,933 relates to a transfer element using CYCOLOR and thermo-autochrome technology, but having no separate transfer layer.

U.S. Pat. No. 5,798,179 is directed to a printable heat transfer material using a thermoplastic polymer such as a hard acrylic polymer or poly(vinyl acetate) as a barrier layer, and has a separate film-forming binder layer.

U.S. Pat. No. 5,271,990 relates to an image-receptive heat transfer paper which includes an image-receptive melt-transfer film layer comprising a thermoplastic polymer overlaying the top surface of a base sheet.

U.S. Pat. No. 5,502,902 relates to a printable material comprising a thermoplastic polymer and a film-forming binder.

U.S. Pat. No. 5,614,345 relates to a paper for thermal image transfer to flat porous surfaces, which contains an ethylene copolymer or a ethylene copolymer mixture and a dye-receiving layer.

However, none of these prior art transfer sheets provides for the direct imaging of a receptor article.

SUMMARY OF THE INVENTION

The present invention relates to a non-transferable heat sealable element, which comprises either (a) a porous or irregular, absorbent support or (b) a non-porous or smooth support, and a heat sealing layer comprising a thermoplastic polymer which melts in the range of 50–250° C., a wax which melts in the range of 50–250° C., or combinations thereof, wherein said porous absorbent support does not have a tack-free surface (e.g. does not contain silicone or similar tack free release material) and which absorbs at least 1% of said heat sealing layer, or said non-porous or smooth support has a surface which has a surface energy of at least 10 mN/m more than the heat sealing layer. The heat sealable element further optionally comprises an Image Receiving Layer which comprises at least one polymer which is capable of receiving and retaining water base colorants, said Image Receiving Layer either does not melt when heat is applied or melts at a temperature above the melting temperature of the heat sealing layer. Preferably, the Image Receiving Layer does not melt below 260° C. The optional Image Receiving Layer is not necessary when dyes such as non-water color dyes or dyes, that will be retained by the heat sealing layer, are imaged directly onto the heat sealing layer.

The present invention further relates to a process for heat sealing an image, which comprises imaging the above-described non-transferable heat sealable element and heating said imaging element in order to melt heat the sealing layer, but not the Image Receiving Layer, in order to form a substantially single layer and encapsulate the water base colorant in said single layer. The optional Image Receiving Layer is not necessary when dyes such as non-water color dyes or dyes, that will be retained by the heat sealing layer, are imaged directly onto the heat sealing layer.

DETAILED DESCRIPTION OF THE INVENTION

The present invention is a non-transferable heat sealable element, which comprises either (a) a porous or irregular, absorbent support or (b) a non-porous or smooth support, and a heat sealing layer comprising a thermoplastic polymer which melts in the range of 50–250° C., a wax which melts in the range of 50–250° C., or combinations thereof, wherein said porous absorbent support does not have a tack-free surface (e.g. does not contain silicone or similar tack free release material) and which absorbs at least 1% of said heat sealing layer, or said non-porous or smooth support has a surface which has a surface energy of at least 10 mN/m more than the heat sealing layer.

The heat sealable element accepts dyes such as ink jet dyes. If ink jet dyes are used, the resolution is comparable to the resolution and color saturation obtained with standard ink jet papers. The ink jet receiving heat sealable element can become waterfast by heating a coating containing a heat sealing layer comprising polymers and/or waxes which melts within a temperature range from 50–250° C., preferably 65–220° C., more preferably 70–180° C., wherein the heat sealing layer has an Image Receiving Layer thereon.

After the heat sealable element is marked with a colorant, it is subjected to heat (e.g. 65–220° C.) from, for instance, a hand held household iron with firm pressure for a sufficient time to melt the heat sealing layer (e.g. 10–40 seconds) or subject to heat from a heat press to activate (i.e. melt) the polymers, encapsulate the colorant, and optionally provide water resistance.

Without applying heat and pressure, colorant retention and image resolution are improved with the use of the coating alone relative to an imaged support (e.g. fabric) without the coating. However, this improvement is not to the degree exhibited when the coating is used and heat and pressure are also employed.

When fabric is the support of choice, the coated fabric (e.g. a fabric swatch or fabric on a bolt) can be hand marked or fed into an inkjet printer independently, or the coated fabric is adhered to a nonwoven cellulose support or film (e.g. polyacetate) for added rigidity.

After heat is applied to melt the heat sealable coating, the melted heat sealable coating is mixed with the unmelted imaged, Image Receiving Layer (when present) to form a single coating. Regardless of whether an Image Receiving Layer is used or not, as a result of the heating, the image is encapsulated, thereby providing the fabric material with an improved resistance to fraying during washing and/or mechanical handling.

End uses for the non-transferable heat sealable element includes use as a printable material for making personalized clothing, signage, or for any use where it is desirable to permanently mark a substrate. For instance, the heat sealing layer and the optional Image Receiving Layer may be applied to a sign and then imaged. Heat is then applied to the imaged sign in order to melt the heat sealing layer (but not the Image Receiving Layer) into a single layer in order to encapsulate the image in the heat sealing layers so as to make the sign waterproof and/or resistant to wear.

Figure 1:
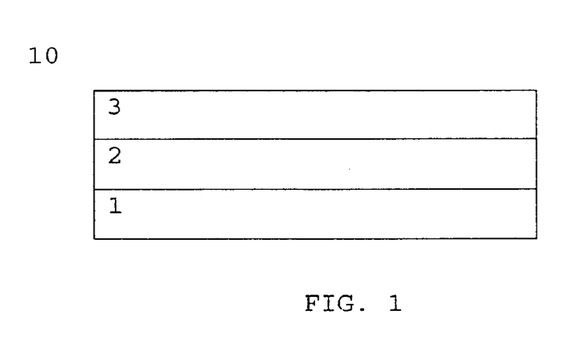
FIG. 1 represents a first embodiment of the present invention when the invention is used with water soluble dyes or with dyes that will not be retained by the heat sealing layer.

With reference to FIG. 1, numeral 1 corresponds to the support of the invention, numeral 2 corresponds to the heat sealing layer (HSL), and numeral 3 corresponds to the Image Receiving Layer (IRL). This embodiment (10) is intended to be used with water soluble dyes or with dyes that will not be retained by the HSL.

Figure 2:
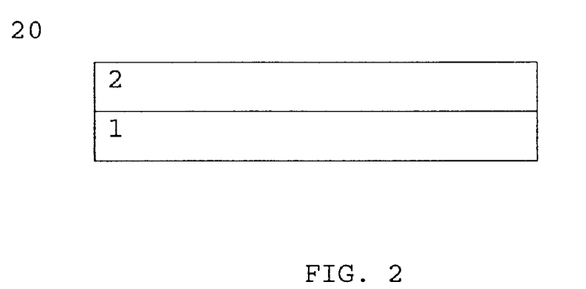
FIG. 2 represents a second embodiment of the present invention when the invention is used with non-water soluble dyes or with dyes that will be retained by the heat sealing layer.

With reference to FIG. 2, numeral 1 corresponds to the support of the invention and numeral 2 corresponds to the heat sealing layer (HSL). This embodiment (20) is intended to be used with non-water soluble dyes or with dyes that will be retained by the HSL, thereby rendering the presence of the IRL to be unnecessary.

Figure 3:
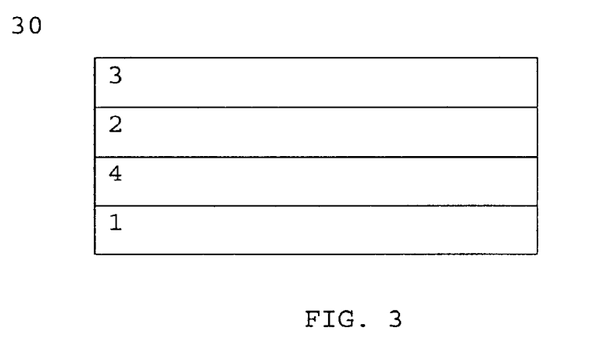
FIG. 3 represents a third embodiment of the present invention wherein an adhesive layer is positioned between the support and the heat sealing layer and wherein the invention is used with water soluble dyes or with dyes that will not be retained by the heat sealing layer.

With reference to FIG. 3, numeral 1 corresponds to the support of the invention, numeral 2 corresponds to the heat sealing layer (HSL), numeral 3 corresponds to the Image Receiving Layer (IRL), and numeral 4 corresponds to the adhesive layer positioned between the support and the HSL. This embodiment (30) is intended to be used with water soluble dyes or with dyes that will not be retained by the HSL.

Figure 4:
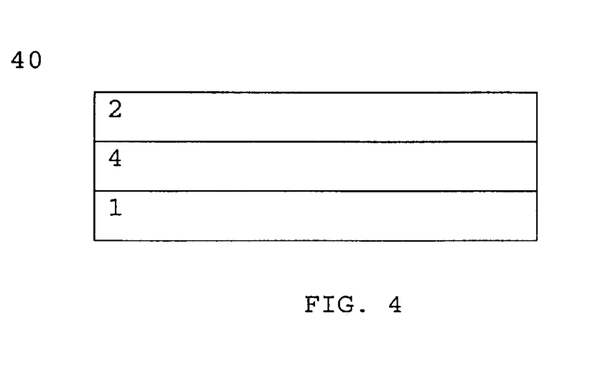
FIG. 4 represents a fourth embodiment of the present invention wherein an adhesive layer is positioned between the support and the heat sealing layer and wherein the invention is used with non-water soluble dyes or with dyes that will be retained by the heat sealing layer.

With reference to FIG. 4, numeral 1 corresponds to the support of the invention, numeral 2 corresponds to the heat sealing layer (HSL), and numeral 4 corresponds to the adhesive layer positioned between the support and the HSL. This embodiment (40) is intended to be used with non-water soluble dyes or with dyes that will be retained by the HSL, thereby rendering the presence of the IRL to be unnecessary.

Support

The support may be either (a) a porous or irregular, absorbent support or (b) a non-porous or smooth support. However, the support should not have a tack-free surface, that is, the support should not contain silicone or similar tack free release material. When the support is a porous or irregular support, it should absorbs at least 1% of the heat sealing layer. When the support is a non-porous or smooth support, the surface which is coated should have a surface energy of at least 10 mN/m more than the heat sealing layer. The support comprises any woven or nonwoven cloth or fabrics, polyester, cotton, or blends having the above characteristics. The support may also be a paper, film, or composite materials used for display and signage applications having the above-mentioned characteristics. However, in contrast to the supports of conventional transfer materials known in the art, the support of the present invention, which is not a transfer element, is sticky so as to develop a strong bond between the layers above it, rather than being tack-free. That is, the present invention is not a transfer material and strong adhesion is desired between the support and the heat sealing layer. This is in contrast to transfer materials where weak interactions are desired between the support and the transfer coating so that the support can be separated from the coatings above it.

Accordingly, when the support of the present invention is a porous or adsorbent support, a portion of the heat sealing layer is preferably absorbed into the support in order to increase adhesion between the support and the surface coating(s). Preferably, at least 1 wt % of the heat sealing layer should be absorbed into the support of the invention. More preferably, at least 5 wt % of the heat sealing layer should be absorbed, still more preferably, at least 10 wt % of the heat sealing layer should be absorbed, and even more preferably, 20 wt % of the heat sealing layer should be absorbed into the support of the invention.

In order to further increase the adhesion between the support of the invention and the heat sealing layer, adhesives may be utilized between these layers. Suitable adhesives are selected from the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride). The adhesive is present in an amount of 0.1–15 g/m$^2$, preferably 0.1–10 g/m$^2$, more preferably 0.1–5 g/m$^2$.

Heat Sealing Layer

The heat sealing layer comprises polymers and/or waxes which melts within a temperature range from 50–250° C., preferably 65–220° C., more preferably 70–180° C. Upon coating, the HSL is most preferably partially absorbed by the substrate, such as a fabric. Otherwise, a suitable adhesive will be necessary to bind the HSL to the support. Preferably, excess HSL not absorbed by the support forms a film on the top surface of the support. The HSL may comprise wax, thermoplastic polymers, or any combination thereof. The preferred binder chemical of the HSL is an ethylene acrylic acid copolymer, yet other suitable binders include, but are not limited to, acrylic/styrene; Coumarone-indene resin, Ethylene/vinyl chloride copolymer; Phenylmethyl polysiloxane; Polyacrylamide; Polybutene; Polyvinyl alcohol, partially hydrolyzed; Polyvinyl methyl ether; PVM/MA copolymer, butyl ester; PVM/MA copolymer, ethyl ester, Styrene/acrylates copolymer, Styrene-butadiene rubber; Styrene/MA copolymer; Styrene/PVP copolymer, Vinyl acetate/ethylene copolymer; Vinyl acetate/ethylene/vinyl chloride terpolymer; Vinyl actetate/vinyl laurate/vinyl hloride terpolymer; Vinyl acrylic copolymer; Vinyl chloride/vinyl acetate copolymer; Vinyl chloride/vinyl acetate/ethylene terpolymer; vinylidene chloride copolymer.

Other suitable binders include those listed in U.S. Pat. No. 5,798,179, in addition to polyolefins, polyesters, ethylene-vinyl acetate, copolymers, and ethylene-methacrylate acid copolymers. Waxes, categorized as natural waxes, include vegetable waxes such as carnuba wax, candelilla wax, rice wax and haze wax; mineral waxes such as ceresine wax, montan wax and derivatives of these; and petroleum waxes such as paraffin wax, and microcrystalline wax. Further, synthetic waxes can be used, which include polyethylene wax, oxidized polyethylene wax, and Fisher-Tropsch wax. Suitable coating weight is in the range of 1–50 g/m$^2$ (dry), preferably in the range of 5–30 g/m$^2$ (dry), more preferably in the range of 15–25 g/m$^2$ (dry).

The heat sealing layer of the invention may comprise a thermoplastic polymer which melts in a range of from about 65° C. to about 180° C. and has a solubility parameter of at least about 14 (Mpa)$^{1/2}$, preferably at least about 16 (Mpa)$^{1/2}$, and most preferably from 18–32 (Mpa)$^{1/2}$.

The heat sealing layer of the invention may comprise several layers if desired. Chemically, the HSL of the invention corresponds to virtually all known release layers in the art of transferring images to t-shirts. Preferred are the release layers disclosed by Kimberly Clark Corporation, of Roswell Ga., and Foto-Wear, Inc. of Milford, Pa.

For instance, the release layers of U.S. Provisional Application No. 60/127,625 filed Apr. 1, 1999 by inventors Scott Williams, Heather Penk and Heather Reid, entitled "Polymeric Composition and Printer/Copier Transfer Sheet Containing The Composition" may be used as the HSL of the present invention. For instance, the HSL may be prepared from, for example, a coating composition comprising a film forming binder, an elastomeric emulsion, a plasticizer, and a water repellant. The water repellant may comprise, for example, polyurethane for the purpose of providing water resistance for toner retention and/or a retention aid.

The HSL of the present invention protects any image, provides mechanical and thermal stability, as well as washability, preferably without losing the flexibility of the textile. That is, the HSL should also provide a colorfast image (e.g. washproof or wash resistant). Thus, upon washing the receptor element (e.g. tee shirt) the image should remain intact.

Further, the HSL satisfies the requirement for compatible components, in that the component dispersions remain in their finely dispersed state after admixture, without coagulating or forming clumps or aggregated particles which would adversely affect image quality. Additionally, the HSL is preferably non-yellowing.

The HSL has a low content of organic solvents, and any small amounts present during the coating process are sufficiently low as to meet environmental and health requirements. More specifically, the HSL preferably has a content of organic solvents of less than 2% weight by weight of components. More preferably, the HSL has a content of organic solvents of less than 1% weight by weight of components.

Various additives may be incorporated into the HSL and/or Image Receiving Layer(s). Retention aids, wetting agents, plasticizers and water repellants are examples. Each will be discussed in turn, below.

Retention Aids

An additive may be incorporated for the purpose of aiding in the binding of the applied colorant such as water-based ink jet colorants and/or dry or liquid toner formulations. Such additives are generally referred to as retention aids. Retention aids that have been found to bind colorants generally fall into three classes: silicas, latex polymer and polymer retention aids. Silicas and silicates are employed when the colorant is water-based such as ink jet formulations. An example of widely used silicas are the Ludox (DuPont) brands. Polyvinyl alcohol represents as class of polymers that have also been applied to the binding of ink jet dyes. Other polymers used include anionic polymers such as Hercobond 2000 (Hercules). Reten 204LS (Hercules) and Kymene 736 (Hercules) are catonic amine polymer-epichlorohydrin adducts used as retention aids. Latex polymers include, by way of illustration, vinyl polymers and vinyl co-polymer blends such as ethylene-vinyl acetate, styrene-butadiene copolymers, polyacrylate and other polyacrylate-vinyl copolymer blends.

Wetting Agents and Rheology Modifiers

Wetting agents, rheology modifiers and surfactants may also be included in the HSL. Such agents may either be nonionic, cationic or anionic. The surfactant selected should be compatible with the class of polymers used in a formulation. For example, anionic polymers require the use of anionic or non-ionic wetting agents or surfactants. Likewise, cationic surfactants are stable in polymer solution containing cationic or non-ionic polymers. Examples of surfactants or wetting agents include, by way of illustration, alkylammonium salts of polycarboxylic acid, salts of unsaturated polyamine amides, derivatives of nonoxynol, derivatives of octoxynols (Triton X-100 and Triton X-114 (Union Carbide), for example), dimethicone copolymers, silicone glycol copolymers, polysiloxane-polyether copolymers, alkyl polyoxy carboxylates, tall oil fatting acids, ethylene oxide-propylene oxide block copolymers and derivatives of polyethylene glycol.

Viscosity modifiers may also be included. Generally, various molecular weight polyethylene glycols are incorporated to serve this purpose. Polyethylene glycols used generally range in molecular weight from 100 to 500,000 with molecular weights between 200 and 10,000 being the most useful in this application.

Plasticizers

Plasticizers may be included in order to soften hard polymer and polymer blend additions. Plasticizers used include, by way of illustration, polyethylene glycol as well as aromatic derivatives such as di-octyl phthalate, di-decyl phthalate derivatives and tri-2-ethylhexyl trimellitate. Aliphatic plasticizers include derivatives of ethylhexyl adipates and ethylhexyl sebacates. Epoxidized linseed or soya oils may also be incorporated but generally are not used due to yellowing and chemical instability upon heat application.

Water Repellants

Water repellant aids may also be incorporated in order to improve the wash/wear resistance of the image. Examples of additives include polyurethanes, wax dispersions such as carnauba wax, mineral waxes, montan wax, derivatives of montan wax, petroleum waxes, synthetic waxes such as polyethylene and oxidized polyethylene waxes, hydrocarbon resins, amorphous fluoropolymers and polysiloxane derivatives.

Particularly when the imaging method is a laser printer or copier, the HSL of the present invention preferably excludes wax dispersions derived from, for example, a group including but not limited to natural waxes such as carnauba wax, mineral waxes, montan wax, derivatives of montan wax, petroleum waxes, and synthetic waxes such as polyethylene and oxidized polyethylene waxes. If the imaging method used is a nonlaser printer/copier method, waxes are not excluded from use in the material. However, the amount of waxes that may be present in the material of the invention when intended for use in laser printers or copiers must be sufficiently low as to avoid adverse affects on copier or printer operation. That is, the amount of wax present must not cause melting in the printer or copier.

The above properties make this HSL highly suited for compatibilizing the stringent requirements of the electrostatic imaging process with the requirements of heat image technology to provide a product having good image quality and permanence under the demanding conditions of textile application, wear and wash resistance in use, and adhesion to wash resistance on decorated articles.

Suitable examples of the HSLs of the invention are exemplified below.

In one embodiment of the invention, the HSL comprises an ethylene acrylic acid co-polymer dispersion, an elastomeric emulsion, a polyurethane dispersion, and polyethylene glycol. An example of this embodiment is HSL Formulation 1:

HSL Formulation 1

| Components | Parts by weight |
| --- | --- |
| Ethylene Acrylic Acid Co-polymer Dispersion (Michem Prime 4983R, Michelman) | 86 parts |
| Elastomeric emulsion (Hystretch V-29, BFGoodrich) | 5 parts |
| Polyurethane Dispersion (Daotan VTW 1265, Vianova Resins) | 4 parts |
| Polyethylene Glycol (Carbowax Polyethylene Glycol 400, Union Carbide) | 4 parts |
| Polyethylene Glycol Mono ((Tetramethylbutyl) Phenol) Ether (Triton X-100, Union Carbide) | 1 part |

The acrylic dispersion is present in a sufficient amount so as to provide adhesion of the HSL and image to the receptor element and is preferably present in an amount of from 46 to 90 weight %, more preferably 70 to 90 weight % based on the total composition of the HSL.

The elastomeric emulsion provides the elastomeric properties such as mechanical stability, flexibility and stretchability, and is preferably present in an amount of from 1 to 45 weight %, more preferably 1 to 20 weight % based on the total composition of the HSL.

The water repellant provides water resistance and repellency, which enhances the wear resistance and washability of the image on the receptor, and is preferably present in an amount of from 1 to 7 weight %, more preferably 3 to 6 weight % based on the total composition of the HSL.

The plasticizer provides plasticity and antistatic properties to the transferred image, and is preferably present in an amount of from 1 to 8 weight %, more preferably 2 to 7 weight % based on the total composition of the HSL.

Preferably, the acrylic dispersion is an ethylene acrylic acid co-polymer dispersion that is a film-forming binder. The HSL of the invention may utilize the film-forming binders of the image-receptive melt-transfer film layer of U.S. Pat. No. 5,242,739, which is herein incorporated by reference.

Thus, the nature of the film-forming binder is not known to be critical. That is, any film-forming binder can be employed so long as it meets the criteria specified herein. As a practical matter, water-dispersible ethylene-acrylic acid copolymers have been found to be especially effective film forming binders.

The term "melts" and variations thereof are used herein only in a qualitative sense and are not meant to refer to any particular test procedure. Reference herein to a melting temperature or range is meant only to indicate an approximate temperature or range at which a polymer or binder melts and flows to result in a substantially smooth film.

Manufacturers' published data regarding the melt behavior of polymers or binders correlate with the melting requirements described herein. It should be noted, however, that either a true melting point or a softening point may be given, depending on the nature of the material. For example, materials such as polyolefins and waxes, being composed mainly of linear polymeric molecules, generally melt over a relatively narrow temperature range since they are somewhat crystalline below the melting point.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior. Moreover, the melting points or softening points described are better indicators of performance than the chemical nature of the polymer or binder.

Representative binders (i.e., acrylic dispersions) are as follows:

Binder A

Binder A is Michem® 58035, supplied by Michelman, Inc., Cincinnati, Ohio. This is a 35 percent solids dispersion of Allied Chemical's AC 580, which is approximately 10 percent acrylic acid and 90 percent ethylene. The polymer reportedly has a softening point of 102° C. and a Brookfield viscosity of 0.65 pas (650 centipoise) at 140° C.

Binder B

This binder is Michem® Prime 4983R (Michelman, Inc., Cincinnati, Ohio). The binder is a 25 percent solids dispersion of Primacor® 5983 made by Dow Chemical Company. The polymer contains 20 percent acrylic acid and 80 percent ethylene. The copolymer has a Vicat softening point of 43° C. and a ring and ball softening point of 100° C. The melt index of the copolymer is 500 g/10 minutes (determined in accordance with ASTM D-1238).

Binder C

Binder C is Michem® 4990 (Michelman, Inc., Cincinnati, Ohio). The material is 35 percent solids dispersion of Primacor® 5990 made by Dow Chemical Company. Primacor® 5990 is a copolymer of 20 percent acrylic acid and 80 percent ethylene. It is similar to Primacor® 5983 (see Binder B), except that the ring and ball softening point is 93° C. The copolymer has a melt index of 1,300 g/10 minutes and Vicat softening point of 39° C.

Binder D

This binder is Michem® 37140, a 40 percent solids dispersion of a Hoechst-Celanese high density polyethylene. The polymer is reported to have a melting point of 100° C.

Binder E

This binder is Michem® 32535 which is an emulsion of Allied Chemical Company's AC-325, a high density polyethylene. The melting point of the polymer is about 138° C. Michem® 32535 is supplied by Michelman, Inc., Cincinnati, Ohio.

Binder F

Binder F is Michem® 48040, an emulsion of an Eastman Chemical Company microcrystalline wax having a melting point of 88° C. The supplier is Michelman, Inc., Cincinnati, Ohio.

Binder G

Binder G is Michem® 73635M, an emulsion of an oxidized ethylene-based polymer. The melting point of the polymer is about 96° C. The hardness is about 4–6 Shore-D. The material is supplied by Michelman Inc., Cincinnati, Ohio.

The second component of HSL Formulation 1 is an elastomeric emulsion, preferably a latex, and is compatible with the other components, and formulated to provide durability, mechanical stability, and a degree of softness and conformability to the layers.

Films of this material must have moisture resistance, low tack, durability, flexibility and softness, but with relative toughness and tensile strength. Further, the material should have inherent heat and light stability. The latex can be heat sensitized, and the elastomer can be self-crosslinking or used with compatible cross-linking agents, or both. The latex should be sprayable, or roll stable for continuous runnability on nip rollers.

Elastomeric latexes of the preferred type are produced from the materials and processes set forth in U.S. Pat. Nos. 4,956,434 and 5,143,971, which are herein incorporated by reference. This curable latex is derived from a major amount of acrylate monomers such as $C_4$ to $C_8$ alkyl acrylate, preferably n-butyl acrylate, up to about 20 parts per hundred of total monomers of a monolefinically unsaturated dicarboxylic acid, most preferably itaconic acid, a small amount of crosslinking agent, preferably N-methyl acrylamide, and optionally another monolefinic monomer.

Using a modified semibatch process in which preferably the itaconic acid is fully charged initially to the reactor with the remaining monomers added over time, a latex of unique polymer architecture or morphology is created, leading to the unique rubbery properties of the cured films produced therefrom.

The third ingredient of HSL Formulation 1 is a water resistant aid such as a polyurethane dispersion which provides a self-crosslinking solvent and emulsifier-free aqueous dispersion of an aliphatic urethane-acrylic hybrid polymer which, alone, produces a clear, crack-free film on drying having very good scratch, abrasion and chemical resistance. This ingredient is also a softener for the acrylic dispersion and plasticizer aid.

Such product may be produced by polymerizing one or more acrylate and other ethylenic monomers in the presence of an oligourethane to prepare oligourethane acrylate copolymers. The oligourethane is preferably prepared from diols and diisocyanates, the aliphatic or alicyclic based diisocyanates being preferred, with lesser amounts, if any, of aromatic diisocyanates, to avoid components which contribute to yellowing. Polymerizable monomers, in addition to the usual acrylate and methacrylate esters of aliphatic monoalcohols and styrene, further include monomers with carboxyl groups, such as acrylic acid or methacrylic acid, and those with other hydrophylic groups such as the hydroxyalkyl acrylates (hydroxyethyl methacrylate being exemplary). The hydrophylic groups in these monomers render the copolymer product dispersible in water with the aid of a neutralizing agent for the carboxyl groups, such as dimethylethanolamine, used in amount to at least partially neutralize the carboxyl groups after dispersion in water and vacuum distillation to remove any solvents used to prepare the urethane acrylic hybrid. Further formulations may include the addition of crosslinking components such as amino resins or blocked polyisocyanates. Pigments and fillers may be added to any of the coating layers to uniformly tint or color the coated paper for special effect. However, such use would generally not be desired where an image is created in the absence of background coloration. Urethane acrylic hybrid polymers are further described in U.S. Pat. No. 5,708,072, and their description in this application is incorporated by reference.

Self crosslinking acrylic polyurethane hybrid compositions can also be prepared by the processes and materials of U.S. Pat. No. 5,691,425, herein incorporated by reference. These are prepared by producing polyurethane macromonomers containing acid groups and lateral vinyl groups, optionally terminal vinyl groups, and hydroxyl, urethane, thiourethane and/or urea groups. Polymerization of these macromonomers produces acrylic polyurethane hybrids which can be dispersed in water and combined with crosslinking agents for solvent-free coating compositions.

Autocrosslinkable polyurethane-vinyl polymers are discussed in detail in U.S. Pat. No. 5,623,016 and U.S. Pat. No. 5,571,861, and their disclosure of these materials is incorporated by reference. The products usually are polyurethane-acrylic hybrids, but with self-crosslinking functions. These may be carboxylic acid containing, neutralized with, e.g. tertiary amines such as ethanolamine, and form useful adhesives and coatings from aqueous dispersion.

The elastomeric emulsion and polyurethane dispersion are, generally, thermoplastic elastomers. Thermoplastic elastomeric polymers are polymer blends and alloys which have both the properties of thermoplastic polymers, such as having melt flow and flow characteristics, and elastomers, which are typically polymers which cannot melt and flow due to covalent chemical crosslinking (vulcanization). Thermoplastic elastomers are generally synthesized using two or more monomers that are incompatible; for example, styrene and butadiene. By building long runs of polybutadiene with intermittant polystyrene runs, microdomains are established which imparts the elastomeric quality to the polymer system. However, since the microdomains are established through physical crosslinking mechanisms, they can be broken by application of added energy, such as heat from a hand iron, and caused to melt and flow; and therefore, are elastomers with thermoplastic quality.

Thermoplastic elastomers have been incorporated into the present invention in order to provide the image system with elastomeric quality. Two thermoplastic elastomer systems have been introduced; that is, a polyacrylate terpolymer elastomer (for example, Hystretch V-29) and an aliphatic urethane acryl hybrid (for example, Daotan VTW 1265). Thermoplastic elastomers can be chosen from a group that includes, for example, ether-ester, olefinic, polyether, polyester and styrenic thermoplastic polymer systems. Specific examples include, by way of illustration, thermoplastic elastomers such as polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride). Generally, thermoplastic elastomers can be selected from a group having a glass transition temperature (Tg) ranging from about −50° C. to about 25° C.

The fourth component of HSL Formulation 1 is a plasticizer such as a polyethylene glycol dispersion which provides mechanical stability, water repellency, and allows for a uniform, crack-free film. Accordingly, a reason to add the polyethylene glycol dispersion is an aid in the coating process. Further, the polyethylene glycol dispersion acts as an softening agent. A preferred fourth component is Carbowax Polyethylene Glycol 400, available from Union Carbide.

An optional fifth ingredient of HSL Formulation 1 is a surfactant and wetting agent such as polyethylene glycol mono ((tetramethylbutyl) phenol) ether.

HSL Formulation 1, as a preferred embodiment of the invention suitable for laser copiers and laser printers, is wax free.

HSL Formulation 1 may be prepared as follows: five parts of the elastomer dispersion are combined with eighty-six parts of an ethylene acrylic acid co-polymers dispersion by gentle stirring to avoid cavitation. Four parts of a polyurethane dispersion are then added to the mixture. Immediately following the addition of a polyurethane dispersion, four parts of a polyethylene glycol and one part of an nonionic surfactant (e.g., Triton X-100) are added. The entire mixture is allowed to stir for approximately fifteen minutes at a moderate stir rate (up to but not exceeding a rate where cavitation occurs). Once thoroughly combined, the mixture is filtered (for example, through a 53 μm nylon mesh).

In another embodiment of the invention, the HSL comprises an acrylic binder and a wax emulsion. The HSL may further contain a retention aid such as Hercobond 2000®. The retention aid provides water resistance, which enhances the washability of the image on the support. An example of this embodiment may be found in HSL Formulation 2:

| HSL Formulation 2 | |
| --- | --- |
| Components | Parts |
| Ethylene Acrylic Acid Co-polymers dispersion (Michem Prime 4938R, Michelman) | 74 parts (weight) |
| Wax Dispersion (Michelman 73635M, Michelman) | 25 parts (weight) |
| Retention Aid (Hercobond 2000, Hercules) | 1 part (weight) |

Alternatively, the binders suitable for HSL Formulation 1 may be used in lieu of the above-described ethylene acrylic acid copolymer dispersion.

Formulation 2 works in a laser printer or copier despite the presence of wax since the wax is present in sufficiently low amounts so as to not adversely affect imaging such as, for example, by melting within the printer or copier (i.e., at most about 25 parts (weight)).

Formulation 2 may be prepared in the following manner: the ethylene acrylic acid co-polymer dispersion and the wax dispersion are stirred (for example in a beaker with a stirring bar). The retention aid is added, and the stirring continues until the retention aid is completely dispersed.

Another embodiment of the heat sealing layers of the present invention include compositions comprising materials from U.S. Pat. Nos. 5,501,902, 5,271,990 and 5,242,739. The contents of U.S. Pat. Nos. 5,501,902, 5,271,990 and 5,242,739 are herein incorporated by reference. These patents are discussed in turn hereinbelow.

The heat sealing layer of this embodiment may utilize the materials of the second layer of U.S. Pat. No. 5,501,902.

This embodiment preferably includes particles of a thermoplastic polymer having largest dimensions of less than about 50 micrometers, and preferably from about 1 to about 20 micrometers. The particles will more preferably have dimensions of from about 2 to about 10 micrometers. In general, the thermoplastic polymer can be any thermoplastic polymer which meets the criteria set forth herein. Desirably, the powdered thermoplastic polymer will be selected from the group consisting of polyolefins, polyesters, and ethylene-vinyl acetate copolymers.

The heat sealing layer of this embodiment also includes from about 10 to about 50 weight percent of a film-forming binder, based on the weight of the thermoplastic polymer. Desirably, the amount of binder will be from about 10 to about 30 weight percent in general, any film-forming binder may be employed which meets the criteria set forth herein. When the heat sealing layer includes a cationic polymer, a nonionic or cationic dispersion or solution may be employed as the binder. Suitable binders include polyacrylates, polyethylenes, and ethylenevinyl acetate copolymers. The latter are particularly desired because of their stability in the presence of cationic polymers. The binder desirably will be heat softenable at temperatures of about 120° Celsius or lower.

This embodiment of the heat sealing layer desirably also will contain from about 2 to about 20 weight percent of a cationic polymer, based on the weight of the thermoplastic polymer. The cationic polymer may be, for example, an amide-epichlorohydrin polymer, polyacrylamides with cationic functional groups, polyethyleneimines, polydiallylamines, and the like. When a cationic polymer is present, a compatible binder should be selected. The binder desirably will be a nonionic binder, either in the form of a solution or a nonionic or cationic dispersion or emulsion. As is well known in the paper coating art, many commercially available binders have anionically charged particles or polymer molecules. These materials are generally not compatible with the cationic polymer which may be used in the present invention.

One or more other components may be used with this embodiment of the heat sealing layer. For example, the heat sealing layer may contain from about 1 to about 20 weight percent of a humectant, based on the weight of the thermoplastic polymer. Desirably, the humectant will be selected from the group consisting of ethylene glycol and poly (ethylene glycol). The poly(ethylene glycol) typically will have a weight average molecular weight of from about 100 to about 40,000. A poly(ethylene glycol) having a weight-average molecular weight of from about 200 to about 800 is particularly useful.

The heat sealing layer also may contain from about 0.2 to about 10 weight percent of a fluid (e.g. ink) viscosity modifier, based on the weight of the thermoplastic polymer. The viscosity modifier desirably will be a poly(ethylene glycol) having a weight-average molecular weight of from about 100,000 to about 2,000,000. The poly(ethylene glycol) desirably will have a weight-average molecular weight of from about 100,000 to about 600,000.

Other components which may be present in the heat sealing layer include from about 0.1 to about 5 weight percent of a weak acid and from about 0.5 to about 5 weight percent of a surfactant, both based on the weight of the thermoplastic polymer. A particularly useful weak acid is citric acid. The term "weak acid" is used herein to mean an acid having a dissociation constant less than one (or a negative log of the dissociation constant greater than 1).

The surfactant may be an anionic, a nonionic, or a cationic surfactant. When a cationic polymer is present in the heat sealing layer, the surfactant should not be an anionic surfactant.

Desirably, the surfactant will be a nonionic or cationic surfactant. However, in the absence of the cationic polymer, an anionic surfactant may be used, if desired. Examples of anionic surfactants include, among others, linear and branched-chain sodium alkylbenzenesulfonates, linear and branched-chain alkyl sulfates, and linear and branched-chain alkyl ethoxy sulfates. Cationic surfactant include, by way of illustration, tallow trimethylammonium chloride. Examples of nonionic surfactants, include, again by way of illustration only, alkyl polyethoxylates, polyethoxylated alkylphenols, fatty acid ethanol amides, complex polymers of ethylene oxide, propylene oxide, and alcohols, and polysiloxane polyethers. More desirably, the surfactant will be a nonionic surfactant.

The HSL layer may also utilize the materials from a melt-heat sealing layer of the '902 patent. Such a melt film layer typically comprises a film forming binder, as already described, or other polymer. The layer desirably is applied by extrusion coating, but other methods also may be used. The melt film layer desirably is formed from a polyethylene or a copolymer of ethylene with acrylic acid, methacrylic acid, vinyl acetate, or acrylic acid esters such as ethyl acrylate. The polymer desirably will have a melt flow rate of at least about 30 grams per 10 minutes (g/10 minutes), as determined in accordance with ASTM Method D-1238, although the melt flow rate may be as high as about 4,000 g/10 minutes. More desirably, the melt flow rate of the polymer will be from about 300 to about 700 g/10 minutes.

The basis weight of the melt film layer desirably will be from about 5 to about 30 grams per square meter (g/m$^2$).

The heat sealing layer of the invention may also correspond to the release layer of the '902 patent, which desirably will be a low molecular weight ethylene-acrylic acid copolymer applied from an aqueous dispersion. The melt flow rate of the ethylene-acrylic acid copolymer desirably will be at least about 200 g/10 minutes, more desirably from about 800 to about 1,200 g/10 minutes. Such dispersion also may contain a paraffin wax, which is mixed as an emulsion with the ethylene-acrylic acid copolymer dispersion. The paraffin wax emulsion can be any of those which are commercially available, such as Chemwax® 40 (Chematron, Inc., Charlotte, N.C.). The ratio of paraffin wax to the copolymer may vary from 0 to about 4, with a ratio of about 1 being more desirable. The basis weight of the HSL layer desirably will be from about 5 to about 30 g/m$^2$.

Accordingly, the heat sealing layer of the invention may comprise particles of a thermoplastic polymer preferably having largest dimensions of less than about 50 micrometers, preferably from about 1 to about 20 micrometers, and more preferably from about 2 to about 10 micrometers, from about 10 to about 50 weight percent of a film-forming binder, based on the weight of the thermoplastic polymer, and from about 0.2 to about 10 weight percent of a viscosity modifier, based on the weight of the thermoplastic polymer.

The heat sealing layer has a melting point of more than 65° C., preferably more than 100° C. and more preferably from about 100 to about 180° C. The heat sealing layer may also contain from about 2 to about 20 weight percent of a cationic polymer, based on the weight of the thermoplastic polymer. The heat sealing layer may also contain from about 1 to about 20 weight percent of a humectant, based on the weight of the thermoplastic polymer. The humectant may be (1) ethylene glycol or (2) polyethylene glycol (e.g. having a weight-average molecular weight of from about 100 to about 40,000, preferably about 200 to about 800).

The viscosity modifier may be a polyethylene glycol having a weight average molecular weight of from 100,000 to about 2,000,000, preferably from about 100,000 to about 600,000. The viscosity modifier may be low or high viscosity methyl cellulose or polyvinyl alcohol.

The heat sealing layer may also include about 0.1 to about 5 weight percent of a weak acid, based on the weight of the thermoplastic polymer. The heat sealing layer may also include about 0.5 to about 5 weight percent of a surfactant (e.g. nonionic or cationic), based on the weight of the thermoplastic polymer.

The heat sealing layer may further comprise from about 1 to about 20 weight percent of a humectant, based on the weight of the thermoplastic polymer (and optionally from about 0.2 to about 10 weight percent of a fluid (e.g. ink) viscosity modifier, based on the weight of the thermoplastic polymer), and from 0.5 to about 5 weight percent of a surfactant, based on the weight of the thermoplastic polymer.

The heat sealing layer of the present invention may also utilize the materials of the image receptive melt-transfer film layer of U.S. Pat. No. 5,271,990.

In this embodiment, the heat sealing layer may be comprised of a thermoplastic polymer which melts at above 65° C., preferably above 100° C., and more preferably in the range of from about 100 to about 180° C. In another embodiment, the thermoplastic polymer melts in the range of from about 80° C. to 120° C., preferably from 100° C. to about 120° C.

That is, any known thermoplastic polymer can employed so long as it meets the criteria specified herein. Preferably, the thermoplastic polymer is selected from the group consisting of polyolefins, polyesters, and ethylene-vinyl acetate copolymers, having a particle size of less than 50 micrometers, preferably having a particle size of less than 20, and more preferably less than 10 micrometers.

In general, the HSL, corresponding to the melt-transfer film layer of the '990 patent, is comprised of a first thermoplastic polymer and the image receptive film layer is comprised of a second thermoplastic polymer, each of which melts above 65° C., preferably above 100° C., and more preferably in the range of from about 100° C. to about 180° C. Preferably, the first thermoplastic polymer is selected from the group consisting of polyolefins, polyesters, ethylene-vinyl acetate copolymers, ethylene-methacrylic acid copolymers, and ethylene-acrylic acid copolymers. In addition, the second thermoplastic polymer preferably is selected from the group consisting of polyolefins, polyesters, and ethylene-vinyl acetate copolymers.

Again, reference herein to a melting temperature or range is meant only to indicate an approximate temperature or range at which a thermoplastic polymer melts and flows under film forming conditions to result in a substantially smooth film.

Accordingly, the heat sealing layer may comprise a thermoplastic polymer selected from the group consisting of polyolefins, polyesters, and ethylene-vinyl acetate copolymers and which melts above 65° C., and preferably above 100° C., and more preferably in the range of from about 100 to about 180° C., and most preferably in the range of about 100 to about 120° C.

An example of the heat sealing layer of the invention is produced by coextruding a 25 micrometer film of Elvax 3200 and a 19 micrometer film of Surlyn 1702 as described in Example 1 of U.S Pat. No. 5,271,990. Elvax 3200 is supplied by E. I. Du Pont de Nemours & Company, Inc., Polymer Products Department, Ethylene Polymers Division, Wilmington, Del. Elvax 3200 is an ethylene-vinyl acetate copolymer containing approximately 25% vinyl acetate and modified with wax. It has a melt index of 32 g/10 minutes. Surlyn 1702 also supplied by DuPont. Surlyn 1702 is an ionomer consisting of a cross-linked ethylene-methacrylic acid copolymer having a melt index of 14 g/10 minutes.

In another embodiment, the heat sealing layer of the present invention may also utilize the materials of the image-receptive melt-transfer film layer of U.S. Pat. No. 5,242,739.

The heat sealing layer may comprise from about 15 to about 80 percent by weight of a film-forming binder selected from the group consisting of ethylene-acrylic acid copolymers, polyolefins, and waxes and from about 85 to about 20 percent by weight of a powdered thermoplastic polymer selected from the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts above about 65° C., preferably above about 100, and more preferably in the range of from about 100 to about 180° C. and said powdered thermoplastic is preferably of particles which are from about 1 to about 50 micrometers in diameter, preferably about 2 to 50, and more preferably 1 to about 20 micrometers in diameter.

Thus, the heat sealing layer comprises from about 15 to about 80 percent by weight of a film-forming binder and from about 85 to about 20 percent by weight of a powdered thermoplastic polymer. Each of the film-forming binders and powdered thermoplastic polymers melt above 65° C., preferably above 100° C., and more preferably in the range of from about 100 to about 180° C. In addition, the powdered thermoplastic polymer is preferably composed of particles having diameters of about 50 micrometers, more preferably from about 2 to 50 micrometers, and most preferably from about 1 to about 20 micrometers.

In other embodiments, each of the film-forming binders and powered thermoplastic polymers melt in the range from 80° C. to above 120° C., preferably in the range of from about 100° C. to about 120° C.

The nature of the film-forming binder is not known to be critical. That is, any film-forming binder can be employed so long as it meets the criteria specified herein. In preferred embodiments, the film-forming binder has a lower melt viscosity than the powdered thermoplastic polymer. As a practical matter, water-dispersible ethylene-acrylic acid copolymers have been found to be especially effective film forming binders.

In general, the powdered thermoplastic polymer can be any thermoplastic polymer which meets the criteria set forth herein. Preferably, the powdered thermoplastic polymer is selected from the group consisting of polyolefins, polyesters, and ethylene-vinyl acetate copolymers.

The HSL, corresponding to the melt-transfer film layer, comprises a film-forming binder as already described. The image-receptive film layer preferably comprises from about 15 to about 80 percent by weight of a film-forming binder (e.g. ethylene-acrylic acid copolymers; polyolefins and waxes which melt in the range of about 65 to about 180° C.). The heat sealing layer may also contain from about 85 to about 20 percent by weight of a powdered thermoplastic polymer, each of which are as already defined.

As a general rule, the amount of powdered thermoplastic polymer employed can be reduced if larger particle sizes are employed.

If desired, any embodiment of the HSL can contain other materials, such as processing aids, pigments, deglossing agents, antifoam agents, and the like. The use of these and other like materials is well known to those having ordinary skill in the art.

Representative binders include Binders A–G discussed above and the following powdered thermoplastic polymers.

Powdered Thermoplastic Polymer A

This powdered polymer is Microthene® FE 532, an ethylenevinyl acetate copolymer supplied by Quantum Industries, Cincinnati, Ohio. The particle size is reported to be 20 micrometers. The vicat softening point is 75° C. and the melt index is 9 g/10 minutes.

Powdered Thermoplastic Polymer B

Powdered Thermoplastic Polymer B is Aqua Polysilk 19. It is a micronized polyethylene wax containing some polytetrafluoroethylene. The average particle size is 18 micrometers and the melting point of the polymer is 102°–1180° C. The material is supplied by Micro Powders, Inc., Scarsdale, N.Y.

Powdered Thermoplastic Polymer C

This material is Microthene® FN-500, a polyethylene powder supplied by USI Chemicals Co., Cincinnati, Ohio. The material has a particle size of 20 micrometers, a Vicat softening point of 83° C., and a melt index of 22 g/l0 minutes.

Powdered Thermoplastic Polymer D

This polymer is Aquawax 114, supplied by Micro Powders, Inc., Scarsdale, N.Y. The polymer has a reported melting point of 91–93° C. and an average particle size of 3.5 micrometers; the maximum particle size is stated to be 13 micrometers.

Powdered Thermoplastic Polymer E

Powdered Thermoplastic Polymer E is Corvel® 23-9030, a clear polyester from the Powder Coatings Group of the Morton Chemical Division, Morton Thiokol, Inc., Reading, Pa.

Powdered Thermoplastic Polymer F

This material is Corvel® natural nylon 20-9001, also supplied by Morton Thiokol, Inc.

Powdered Thermoplastic Polymer G

This polymer powder is Corvel® clear epoxy 13-9020, supplied by Morton Thiokol, Inc.

Powdered Thermoplastic Polymer H

Powdered Thermoplastic Polymer H is AClyn® 246A, which has a melting temperature of about 95° C. as determined by differential scanning calorimetry. The polymer is an ethylene-acrylic acid magnesium ionomer. The material is supplied by Allied-Signal, Inc., Morristown, N.J.

Powdered Thermoplastic Polymer I

This polymer is AC-316A, an oxidized high density polyethylene. The material is supplied by Allied Chemical Company, Morristown, N.J.

Powdered Thermoplastic Polymer J

This polymer is Texture 5380, supplied by Shamrock Technologies, Inc., Newark, N.J. It is powdered polypropylene having a melting point of 165° C. and an average particle size of 40 micrometers.

The binders and thermoplastic polymers may be combined and blended as desired. For example, Binder A (e.g. 80 parts) may be blended with powdered thermoplastic polymer A (e.g. 80 parts) and optionally with a fluorocarbon dispersion such as Zonyl 7040 (e.g. 0.20 parts) obtained from DuPont. Another example includes combining Binder B (e.g. 400 parts) and Polymer B (e.g. 70 parts) and blending in a standard laboratory colloid mill. Also, Binder A (e.g. 286 parts) may be combined with Polymer C (e.g. 65 parts). Binder B (e.g. 400 parts) may be combined with Polymer D (e.g. 70 parts). Binder C (e.g. 200 parts) may be combined with Polymer E (e.g. 35 parts) and optionally with propylene glycol (e.g. 20 parts) and water (e.g. 20 parts). Similarly, Binder C (e.g. 200 parts) may be combined with Polymer F (e.g. 54 parts) and optionally with propylene glycol (e.g. 20 parts) and water (e.g. 20 parts). Also, Binder A (e.g. 200 parts) may be combined with Polymer G (e.g. 30 parts) and optionally with propylene glycol (e.g. 20 parts) and water (e.g. 20 parts). Binder D (e.g. 200 parts) may be combined with Polymer H (e.g. 30 parts) and optionally water (e.g. 40 parts) and blended. Binder A (e.g. 286 parts) may be combined with Polymer J (e.g. 40 parts) and optionally with propylene glycol (e.g. 50 parts).

Image Receiving Layer

At least one of the coatings of the present invention should be able to retain an image such as an image dye. However, when the HSL is not capable of retaining a dye, the IRL of the invention is required. The IRL retains dyes, such as ink from ink jet printers, or dyes from a waterbased marker. If ink jet ink is utilized, the image preferably has comparable resolution to standard ink jet paper. Upon the application of heat, the HSL and the optional IRL become heat activated (e.g. melt) to trap or encapsulate the dye image or ink and optionally impart waterfast characteristics.

The IRL comprises binders, such as polyvinyl alcohol (PVOH), various colorant retention aids, and an antioxidant. An antioxidant is added to keep the polyvinyl alcohol (PVOH) from discoloring (yellowing) during the heat process. The preferred PVOH is described in Example 2. However, other polyvinyl alcohols may be used which is considered to be of fully hydrolyzed (98.0–98.8% hydrolysis) or preferably super hydrolyzed grade (99.3+% hydrolysis).

In addition to polyvinyl alcohol, suitable binders for the IRL include crystalline polymers such as polyesters, polyamides, polyurethanes, polyethers, vinyl polymer and copolymer blends, and polymer and copolymer blends which form ordered close packed film structures. Examples include, but are not limited to poly(methyl vinyl ether), poly(vinyl chloride), poly(styrene), poly(ethylene adipate), poly(hexamethylene adipamide), poly(acetate), poly (ethylene terephthalate), poly(methyl methacrylate), poly (acrylic acid), poly acrylate and poly(vinyl butyral).

Suitable antioxidants include, but are not limited to, BHA; Bis(2,4-di-t-butylphenyl)pentaerythritol diphosphite; 4,4'-Butylidenebis (6-t-butyl-m-cresol), C20–40 alcohols; p-Crescol/dicyclopentadiene butylated reaction product, Di (butyl, methyl pyrophosphato) ethylene titanate di (dioctyl, hydrogen phosphite); Dicyclo (dioctyl) pyrophosphato titanate; Di(dioctylphosphato) ethylene titanate; Di (dioctylpyrophosphato) ethylene titanate; Disobutyl nonyl phenol; Dimethylaminomethyl phenol, Ethylhydroxymethyloleyl oxazoline Isopropyl 4-aminobenzenesulfonyl di (dodecylbenzenesulfonyl) titanate; Isopropyldimethacrylisoslearoyl titanate; Isopropyl (dioctylphosphato) titanate; isopropyltridioctylpyrophosphato) titanate; Isopropyl tri (N ethylamino-ethylamino) titanate, Lead phthalate, basic 2,2 -Methylenebis (6-t-butyl-4-methylphenol), Octadecyl 3,5-di-t-butyl-4-hydroxyhydrocinnamate Phosphorus; Phosphorus tnchloride, reaction prods with 1,1'-biphenyl and 2,4-bis (1,1-dimethylethyl) phenol Tetra (2, diallyoxymethyl-1 butoxy titanium di (di-tridecyl) phosphite; Tetraisopropyl di (dioctylphosphito) titanate; Tetrakis [methylene (3,5-di-t-butyl-4-hydroxyhydrocinnamate)] methane; Tetraoctyloxytitanium; di (ditridecylphosphite); 4,4'-Thiobis-6-(t-butyl-m-cresol); Titanium di (butyl, octyl pyrophosphate) di (dioctyl, hydrogen phosphite) oxyacetate; Titanium di (cumylphenylate) oxyacetate; Titanium di (dioctylpyrophosphate), oxyacelate; Titanium dimethyacrylate oxyacetate; 2,2,4-Trimethyl-1,2-dihydroquinoline polymer; Tris(nonylphenyl) phosphite.

Preferably, the antioxidant used is octadecyl 3,5-Di-tert-butyl-4-hydroxyhydrocinnamate. An aqueous solution of a cationic amine polymer-epichlorohydrin adduct acts as the dye retention aid. An additional binder is included in order to impart colorant retention and mechanical stability. A list of applicable binders include, but are not limited to, those listed in U.S. Pat. No. 5,798,179, in addition to polyolefins, polyimines, polyamines, polyesters, ethylene-vinyl acetate copolymers, ethylene-methacrylate acid copolymers, and ethylene-acrylic acid copolymers. Suitable coating weight is in the range of 1–50 g/m$^2$ (dry), preferably in the range of 1–30 g/m$^2$ (dry), and more preferably in the range of 1–10 g/m$^2$ (dry).

Chemically, the IRL of the invention corresponds to virtually all known Image Receiving Layers in the art of transfer images to t-shirts. However, the Image Receiving Layer of the invention either does not melt when heat is applied or melts at a temperature above the melting temperature of the heat sealing layer. Preferably, the Image Receiving Layer does not melt below 260° C.

The Image Receiving Layer functions as a retention aid for the image. Accordingly, the Image receiving Layer must be modified according to the marker that is being applied.

In an embodiment where the substrate is marked with a laser copier or printer, the optional Image Receiving Layer is an acrylic coating upon which an image is applied. The Image Receiving Layer may comprise a film-forming binder selected from the group comprising of ethylene-acrylic acid copolymers, polyolefins, and waxes. A preferred binder, especially when a laser copier or laser printer is used in accordance with this invention is an ethylene acrylic acid co-polymer dispersion. Such a dispersion is represented by Image Receiving Layer Formulation 1:

Image Receiving Layer Formulation 1

| Components | Parts |
| --- | --- |
| Ethylene Acrylic Acid Co-polymers Dispersion (Michem Prime 4983R, Michelman). | 100 parts |

Alternatively, the binders suitable for HSL Formulation 1 may be used in lieu of the above-described ethylene acrylic acid copolymer dispersion.

In a preferred embodiment of the invention, when an ink jet printer is used in accordance with the present invention, the Image Receiving Layer may utilize the materials of the fourth layer of U.S. Pat. No. 5,798,179. Thus, for practicing the present invention using an ink jet printer, the Image Receiving Layer may comprise particles of a thermoplastic polymer having largest dimensions of less than about 50 micrometers. Preferably, the particles will have largest dimensions of less than about 50 micrometers. More preferably, the particles will have largest dimensions of less than about 20 micrometers. In general, the thermoplastic polymer may be any thermoplastic polymer which meets the criteria set forth herein. Desirably, the powdered thermoplastic polymer will be selected from the group consisting of polyolefins, polyesters, polyamides, and ethylene-vinyl acetate copolymers.

The Image Receiving Layer also includes from about 10 to about 50 weight percent of a film-forming binder, based on the weight of the thermoplastic polymer. Desirably, the amount of binder will be from about 10 to about 30 weight percent. In general, any film-forming binder may be employed which meets the criteria set forth herein. When the Image Receiving Layer includes a cationic polymer as described below, a nonionic or cationic dispersion or solution may be employed as the binder. Suitable binders include polyacrylates, polyethylenes, and ethylene-vinyl acetate copolymers. The latter are particularly desired because of their stability in the presence of cationic polymers. The binder desirably will be heat softenable at temperatures of about 120° C. or lower.

The Image Receiving Layer typically will have a melting point of from about 65° C. to about 180° C., but the selection thereof is subject to the limitation that it must melt at a higher melting temperature than the HSL. Moreover, the Image Receiving Layer may contain from about 2 to about 20 weight percent of a cationic polymer, based on the weight of the thermoplastic polymer. The cationic polymer may be, for example, an amide-epichlorohydrin polymer, polyacrylamides with cationic functional groups, polyethyleneimines, polydiallylamines, and the like. When a cationic polymer is present, a compatible binder should be selected, such as a nonionic or cationic dispersion or solution. As is well known in the paper coating art, many commercially available binders have anionically charged particles or polymer molecules. These materials are generally not compatible with the cationic polymer which may be used in the Image Receiving Layer.

One or more other components may be used in the Image Receiving Layer. For example, this layer may contain from about 1 to about 20 weight percent of a humectant, based on the weight of the thermoplastic polymer. Desirably, the humectant will be selected from the group consisting of ethylene glycol and poly(ethylene glycol). The poly(ethylene glycol) typically will have a weight-average molecular weight of from about 100 to about 40,000. A poly(ethylene glycol) having a weight-average molecular weight of from about 200 to about 800 is particularly useful.

The Image Receiving Layer also may contain from about 0.2 to about 10 weight percent of an ink viscosity modifier, based on the weight of the thermoplastic polymer. The viscosity modifier desirably will be a poly(ethylene glycol) having a weight-average molecular weight of from about 100,000 to about 2,000,000. The poly(ethylene glycol) desirably will have a weight-average molecular weight of from about 100,000 to about 600,000.

Other components which may be present in the Image Receiving Layer include from about 0.1 to about 5 weight percent of a weak acid and from about 0.5 to about 5 weight percent of a surfactant, both based on the weight of the thermoplastic polymer. A particularly useful weak acid is citric acid. The term "weak acid" is used herein to mean an acid having a dissociation constant less than one (or a negative log of the dissociation constant greater than 1).

The surfactant may be an anionic, a nonionic, or a cationic surfactant. When a cationic polymer is present in the Image Receiving Layer, the surfactant should not be an anionic surfactant. Desirably, the surfactant will be a nonionic or cationic surfactant. However, in the absence of the cationic polymer, an anionic surfactant may be used, if desired. Examples of anionic surfactants include, among others, linear and branched-chain sodium alkylbenzenesulfonates, linear and branched-chain alkyl sulfates, and linear and branched-chain alkyl ethoxy sulfates. Cationic surfactants include, by way of illustration, tallow trimethylammonium chloride. Examples of nonionic surfactants, include, again by way of illustration only, alkyl polyethoxylates, polyethoxylated alkylphenols, fatty acid ethanol amides, complex polymers of ethylene oxide, propylene oxide, and alcohols, and polysiloxane polyethers. More desirably, the surfactant will be a nonionic surfactant.

The Image Receiving Layer may contain the addition of filler agents with the purpose of modulating the surface characteristics of the present invention. The surface roughness and coefficient of friction may need to be modulated depending on such factors as desired surface gloss and the imaging device's specific paper feeding requirements. The filler can be selected from a group of polymers such as, for example, polyacrylates, polyacrylics, polyethylene, polyethylene acrylic copolymers and polyethylene acrylate copolymers, vinyl acetate copolymers and polyvinyl polymer blends that have various particle dimensions and shapes. Typical particle sizes may range from 0.1 to 500 microns. Preferably, the particle sizes range from 5 to 100 microns. More preferably, the particle sizes range from 5 to 30 microns. The filler may also be selected from a group of polymers such as, for example, cellulose, hydroxycellulose, starch and dextran. Silicas and mica may also be selected as a filler. The filler is homogeneously dispersed in the image layer in concentrations ranging from 0.1 to 50%. Preferably, the filler concentration range is 1 to 10 percent. Below is a preferred Image Receiving Layer formulation that further contains a filler agent:

Image Receiving Layer Formulation 2

| Compound | Parts |
|---|---|
| Ethylene Acrylic Copolymer Dispersion (Michem 4983R, Michelman) | 90 to 99 |
| Ethylene Vinyl Acetate Copolymer Powder (Microthene FE-532-00, Equistar Chemical) | 10 to 1 |

An additional preferred Image Receiving Layer formulation that further contains a filler agent is as follows:

Image Receiving Layer Formulation 3

| Compound | Parts |
|---|---|
| Ethylene Acrylic Copolymer Dispersion (Michem 4983R, Michelman) | 90 to 99 |
| Oxidized polyethylene homopolymer (ACumist A-12, Allied Signal Chemical) | 10 to 1 |

By way of illustration, the Image Receiving Layer may optionally comprise the following formulation compositions:

| Formulation | Description |
|---|---|
| A | 100 parts Orgasol 3501 EXDNAT 1 (a 10-micrometer average particle size, porous, copolymer of nylon 6 and nylon 12 precursors), 25 parts Michem Prime 4983, 5 parts Triton X100 and 1 part Methocel A-15 (methyl cellulose). The coating weight is 3.5 lb. per 1300 square feet. |
| B | Like A, but with 5 parts of Tamol 731 per 100 partsOrgasol 3501, and the Metholcel A-15 is omitted. |
| C | Like a Reichold 97-635 coat (a modified poly(vinyl acetate)), but containing 50 parts of Tone 0201 (a low molecular weight polycaprolactone) per 100 parts Orgasol 3501. |
| D | 100 parts Orgasol 3501, 5 parts Tamol 731, 25 parts Michel Prime 4983 and 20 parts PEG 20M. |
| E | 100 parts Orgasol 3501, 5 parts Tamol 731, 25 parts Michel Prime 4983 and 5 parts PEG 20M (a polyethylene glycol having a molecular weight of 20,000) |
| F | 100 parts Orgasol 3501, 5 parts Tamol 731, 25 parts Michem Prime 4983 and 20 parts PEG 20M (an ehtylene glycol oligomer having a molecular weight of 200). |
| G | 100 parts Orgasol 3501, 5 parts Tamol 731 and 25 parts Sancor 12676 (Sancor 12676 is a heat sealable polyurethane). |

The various layers of the present invention are formed by known coating techniques, such as by curtain coating, Meyer rod, roll, blade, air knife, cascade and gravure coating procedures.

Process of Self-lamination

During application of heat and pressure with either a household iron, heat press, or laminating machine, the Heat Sealable Layer (HSL) melts, flows, and fuses with the optional Image Receiving Layer (IRL), when the IRL is present. The temperature during heating may be in the range of 50–250° C., preferably 80–220° C., more preferably 90–210° C., and still more preferably 150–200° C. By forming one polymer layer instead of two, the now single layer traps all colorants, better resists liquids, and increases mechanical stability.

The heating may be applied either from the back of the support or from the top of the IRL or HSL. However, if the IRL or HSL melt when heat is applied directly thereto, it will be necessary to utilize a tack-free sheet such as a silicone sheet between the IRL and/or HSL and the iron or heat press to effect proper heating without damaging the heat sealable element of the invention.

EXAMPLE 1

The preferred formulation for HSL is listed below.

| HSL Formulation One | Parts |
|---|---|
| Ethylene Acrylic Acid Copolymer (Michem 4983R Prime, Michelman Inc., Cincinnati, OH) | 100.00 |

EXAMPLE 2

The preferred formulation for IRL is listed below.

| IRL Formulation | Parts |
|---|---|
| PVOH at a 5–15% solution in water (Airvol 125, Airproduct Inc., Allentown, PA) | 55.00–90.00 |
| Amine polymer (Kymene 450, Hercules Inc., Wilmington, DE) | 23.00–9.00 |
| Styrene Butadiene Latex (Latex XUR-YM-12274, Dow Chemical, Midland, MI) | 20.00–0.99 |
| Antioxidant (Irganox 1076, Ciba Specialty Chemicals Tarrytown, NY) | 2.00–0.01 |

Mixing

Beaker A:

The antioxidant powder is added to specified amount of PVOH solution, heated to approximately 60° C., and mixed at medium stir speed for approximately 30 minutes. Upon incorporation of the antioxidant to the PVOH solution, the solution is cooled to room temperature.

Beaker B: Styrene Butadiene Latex and Amine polymer are allowed to mix at a medium stir rate so as to avoid cavitation.

The Beaker A contents are slowly added to Beaker B and allowed to homogenize in the presence of a medium stir rate.

Filtering

The solution may be filtered with a 50–150μ filter. By filtering the solution, undesired particulates can be separated from the bulk solution.

Coating

The HSL formula is coated at room temperature onto the support in a single pass of a #30 Meyer Rod and force air dried. The IRL is coated directly onto the HSL with a single pass of a #04 Meyer Rod, and force air dried.

All cited patents, publications, copending applications, and provisional applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A non-transferable heat sealable element, which comprises:
    (i) a porous or absorbent support, and
    (ii) a heat sealing layer comprising a thermoplastic polymer which melts in the range of 50–250° C., a wax which melts in the range of 50–250° C., or combinations thereof,
    wherein said porous or absorbent support does not have a tack-free surface and which absorbs at least 1% of said heat sealing layer, and wherein said non-transferable heat sealable element is non-transferable.

2. The heat sealable element of claim 1, further comprising (iii) an Image Receiving Layer which comprises at least one polymer which is capable of receiving and retaining water base colorants, said Image Receiving Layer either does not melt when heat is applied or melts at a temperature above the melting temperature of the heat sealing layer.

3. The heat sealable element of claim 2, wherein said Image Receiving Layer does not melt below 260° C.

4. The heat sealable element of claim 2, wherein said Image Receiving Layer further comprises an oxidized polyethylene homopolymer.

5. The heat sealable element of claim 2, wherein said Image Receiving Layer further comprises an ethylene vinyl acetate copolymer powder.

6. The heat sealable element of claim 2, wherein the Image Receiving Layer comprises an ethylene acrylic acid co-polymer dispersion.

7. The heat sealable element of claim 2, wherein said Image Receiving Layer is present in a dry coat amount of from 1.0 to 10 g/m².

8. The heat sealable element of claim 1, wherein an adhesive is placed between the support and the heat sealing layer.

9. The heat sealable element of claim 8, wherein the adhesive is present in an amount of 0.1–15 g/m².

10. The heat sealable element of claim 1, wherein the support is at least one selected from the group consisting of fabric, paper, metal and plastic.

11. The heat sealable element of claim 1, wherein the heat sealing layer comprises a thermoplastic polymer which melts in a range of from about 65° C. to about 180° C. and has a solubility parameter of at least about 14 (Mpa)$^{1/2}$.

12. The heat sealable element of claim 1, wherein the heat sealing layer comprises a polymeric composition comprising: an acrylic dispersion, an elastomeric emulsion, a water repellant and a plasticizer.

13. The heat sealable element of claim 12, wherein said acrylic dispersion is an ethylene acrylic acid dispersion, said water repellant is a polyurethane dispersion and said plasticizer is a polyethylene glycol.

14. The heat sealable element of claim 13, wherein said polyurethane dispersion has a Tg in the range of from −50° C. to 25° C.

15. The heat sealable element of claim 13, wherein said ethylene acrylic acid dispersion is present in an amount of from 46 to 90 parts by weight; said elastomeric emulsion is present in an amount of from 1 to 45 parts by weight; said polyurethane dispersion is present in an amount of from 1 to 7 parts by weight; and said polyethylene glycol is present in an amount of from 1 to 8 parts by weight.

16. The heat sealable element of claim 13, wherein said ethylene acrylic acid dispersion is present in an amount of 86 parts by weight; said elastomeric emulsion is present in an amount of 5 parts by weight; said polyurethane dispersion is present in an amount of 4 parts by weight; and said polyethylene glycol is present in an amount of 4 parts by weight.

17. The heat sealable element of claim 13, wherein said ethylene acrylic acid dispersion melts in the range of from about 65° C. to about 180° C.

18. The heat sealable element of claim 12, wherein the elastomeric emulsion is selected from the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

19. The heat sealable element of claim 12, wherein said acrylic dispersion is an ethylene acrylic acid dispersion.

20. The heat sealable element of claim 1, wherein the heat sealing layer comprises a polymeric composition comprising a film forming binder, an elastomeric emulsion, a water repellant and a plasticizer.

21. The heat sealable element of claim 20, wherein said elastomeric emulsion has a Tg in the range of from −50° C. to 25° C.

22. The heat sealable element of claim 20, which further comprises a polyethylene glycol mono ((tetramethyl butyl) phenol) ester compound.

23. The heat sealable element of claim 20, wherein the film-forming binder is an acrylic dispersion.

24. The heat sealable element of claim 20, wherein the film-forming binder is an acrylic dispersion, said water repellant is polyurethane dispersion and said plasticizer is a polyethylene glycol.

25. The heat sealable element of claim 20, wherein the film-forming binder which melts in the range of from about 65° C. to about 180° C.; said elastomeric emulsion which has a Tg in the range of from −50° C. to 25° C.; and said water repellant is a polyurethane dispersion which has a Tg in the range of from −50° C. to 25° C.

26. The heat sealable element of claim 20, wherein the film-forming binder is present in an amount of from about 46 to about 90 percent by weight; said elastomeric emulsion is present in an amount of from 1 to about 45 percent by weight; said water repellant is a polyurethane dispersion that is present in an about of from 1 to about 8 percent; and said HSL further comprises a polyethylene glycol present in an amount of from 1 to about 8 percent by weight.

27. The heat sealable element of claim 20, wherein said film-forming binder is present in an amount of 86 percent by weight; said elastomeric emulsion is present in an amount of 5 percent by weight; said water repellant is a polyurethane dispersion that is present in an amount of 4 percent; and said plasticizer is a polyethylene glycol that is present in an amount of 4 percent by weight.

28. The heat sealable element of claim 20, which further comprises a polyethylene glycol.

29. The heat sealable element of claim 28, wherein said polyethylene glycol comprises a polyethylene glycol mono ((tetramethyl butyl) phenol) ester compound.

30. The heat sealable element of claim 20, wherein said elastomeric emulsion is at least one selected from the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

31. The heat sealable element of claim 30, wherein the film-forming binder is at least one selected from the group consisting of ethylene-acrylic acid copolymers, polyolefins, and waxes.

32. The heat sealable element of claim 30, further comprising a retention aid which is at least one selected from the group consisting of polyvinyl alcohols, polymer latexes and silicates.

33. The heat sealable element of claim 1, wherein said heat sealing layer is present in a dry coat amount of from 5 to 30 g/m$^2$.

34. The heat sealable element of claim 1, wherein the heat sealing layer comprises a film-forming binder which melts in the range of from about 65° C. to about 180° C.; a wax dispersion; and a retention aid.

35. The heat sealable element of claim 1, wherein the heat sealing layer has a melting point of at least 65° C. and comprises:
  (i) particles of a thermoplastic polymer having dimensions of about 1 to about 50 micrometers, from about 10 to about 50 weight percent of a film-forming binder, based on the weight of the thermoplastic polymer, and optionally from about 0.2 to about 10 weight percent of a fluid viscosity modifier, based on the weight of the thermoplastic polymer,
  (ii) about 15 to about 80 percent by weight of at least one of a film-forming binder selected from the group consisting of ethylene-acrylic acid copolymers, polyolefins, and waxes and from about 85 to about 20 percent by weight of at least one of a powdered thermoplastic polymer selected from the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts in the range of from about 65° C. to about 180° C. and the powdered thermoplastic polymer consists of particles of about 1 to about 50 micrometers,
  (iii) at least one of a film forming binder selected from the group consisting of ethylene-acrylic acid copolymers having particles of about 1 to about 50 micrometers, polyolefins, and waxes and which melts in the range of from about 65° C. to about 180° C., or
  (iv) a thermoplastic polymer having particles of about 1 to about 50 micrometers selected from at least one of the group consisting of polyolefins, polyesters, ethylene-vinyl acetate copolymers, ethylene-methacrylic acid copolymers, and ethylene-acrylic acid copolymers and which melts in the range of from about 65 to about 180° C.

36. The heat sealable element of claim 1, wherein the heat sealing layer comprises particles of a thermoplastic polymer having dimensions of 1 to 20 micrometers.

37. The heat sealable element of claim 1, wherein the heat sealing layer comprises particles of a thermoplastic polymer having dimensions of about 1 to about 20 micrometers, from about 10 to about 50 weight percent of a film-forming binder, based on the weight of the thermoplastic polymer, and optionally from about 0.2 to about 10 weight percent of a fluid viscosity modifier, based on the weight of the thermoplastic polymer.

38. The heat sealable element of claim 1, wherein the wherein the heat sealing layer melts from about 65 to about 180° C. and comprises particles of a thermoplastic polymer having dimensions of about 1 to about 20 micrometers, from about 10 to about 50 weight percent of a film-forming binder, based on the weight of the thermoplastic polymer, and from about 2 to about 20 weight percent of a cationic polymer, based on the weight of the thermoplastic polymer.

39. The heat sealable element of claim 1, wherein the heat sealing layer comprises from about 15 to about 80 percent by weight of a film-forming binder selected from at least one of the group consisting of ethylene-acrylic acid copolymers, polyolefins, and waxes and from about 85 to about 20 percent by weight of a powdered thermoplastic polymer selected from at least one of the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts in the range of from about 65 to about 180° C. and said powdered thermoplastic consists of particles which are from about 1 to about 50 micrometers in diameter.

40. The heat sealable element of claim 1, wherein the heat sealing layer comprises a film forming binder selected from at least one of the group consisting of ethylene-acrylic acid copolymers having particles of about 1 to 20 micrometers, polyolefins, and waxes and which melts in the range of from about 65 to about 180° C.

41. The heat sealable element of claim 1, wherein the heat sealing layer comprises a thermoplastic polymer having particles of about 1 to 20 micrometers selected from at least one of the group consisting of polyolefins, polyesters, and ethylene-vinyl acetate copolymers and which melts in the range of from about 65 to about 180° C.

42. The heat sealable element of claim 1, wherein the heat sealing layer comprises a thermoplastic polymer having particles of about 1 to 50 micrometers selected from at least one of the group consisting of polyolefins, polyesters, and ethylene-vinyl acetate copolymers, ethylene-methacrylic acid copolymers, and ethylene-acrylic acid copolymers and which melts in the range of from about 65 to about 180° C.

43. The heat sealable element of claim 1, wherein the adhesive is selected from at least one of the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

44. A non-transferable heat sealable element, which comprises:
  (i) a non-porous or smooth support,
  (ii) a heat sealing layer comprising a thermoplastic polymer which melts in the range of 50–250° C., a wax which melts in the range of 50–250° C., or combinations thereof, and
  (iii) an Image Receiving Layer which comprises at least one polymer which is capable of receiving and retaining water base colorants, said Image Receiving Layer either does not melt when heat is applied or melts at a temperature above the melting temperature of the heat sealing layer,
    wherein said non-porous or smooth support has a surface on which said heat sealing layer is to be coated and which has a surface energy of at least 10 mN/m more than the heat sealing layer, and wherein said non-transferable heat sealable element is non-transferable.

45. The heat sealable element of claim 44, wherein the heat sealing layer comprises a polymeric composition comprising: an acrylic dispersion, an elastomeric emulsion, a water repellant and a plasticizer.

46. The heat sealable element of claim 45, wheren said acrylic dispersion is an ethylene acrylic acid dispersion, said water repellant is a polyurethane dispersion and said plasticizer is a polyethylene glycol.

47. The heat sealable element of claim 46, wherein said ethylene acrylic acid dispersion melts in the range of from about 65° C. to about 1809° C.

48. The heat sealable element of claim 46, wherein said polyurethane dispersion has a Tg in the range of from −50° C. to 250° C.

49. The heat sealable element of claim 46, wherein said ethylene acrylic acid dispersion is present in an amount of from 46 to 90 parts by weight; said elastomeric emulsion is present in an amount of from 1 to 45 parts by weight; said polyurethane dispersion is present in an amount of from 1 to 7 parts by weight; and said polyethylene glycol is present in an amount of from 1 to 8 parts by weight.

50. The heat sealable element of claim 46, wherein said ethylene acrylic acid dispersion is present in an amount of 86 parts by weight; said elastomeric emulsion is present in an amount of 5 parts by weight; said polyurethane dispersion is present in an amount of 4 parts by weight; and said polyethylene glycol is present in an amount of 4 parts by weight.

51. The heat sealable element of claim 45, wherein the elastomeric emulsion is selected from the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

52. The heat sealable element of claim 45, wherein said acrylic dispersion is an ethylene acrylic acid dispersion.

53. The heat sealable element of claim 44, wherein the heat sealing layer comprises a polymeric composition comprising a film forming binder, an elastomeric emulsion, a water repellant and a plasticizer.

54. The heat sealable element of claim 53, wherein said elastomeric emulsion has a Tg in the range of from −50° C. to 25° C.

55. The heat sealable element of claim 53, which further comprises a polyethylene glycol mono ((tetramethyl butyl) phenol)ester compound.

56. The heat sealable element of claim 53, wherein the film-forming binder is an acrylic dispersion.

57. The heat sealable element of claim 53, wherein said film-forming binder is an acrylic dispersion, said water repellant is polyurethane dispersion and said plasticizer is a polyethylene glycol.

58. The heat sealable element of claim 53, wherein the film-forming binder which melts in the range of from about 65° C. to about 180° C.; said elastomeric emulsion which has a Tg in the range of from −50° C. to 25° C.; and said water repellant is a polyurethane dispersion which has a Tg in the range of from −50° C. to 25° C.

59. The heat sealable element of claim 53, which further comprises a polyethylene glycol.

60. The heat sealable element of claim 59, wherein said polyethylene glycol comprises a polyethylene glycol mono ((tetramethyl butyl)phenol) ester compound.

61. The heat sealable element of claim 53, wherein the film-forming binder is present in an amount of from about 46 to about 90 percent by weight; said elastomeric emulsion is present in an amount of from 1 to about 45 percent by weight; said water repellant is a polyurethane dispersion that is present in an about of from 1 to about 8 percent; and said heat sealing layer further comprises a polyethylene glycol present in an amount of from 1 to about 8 percent by weight.

62. The heat sealable element of claim 53, wherein said film-forming binder is present in an amount of 86 percent by weight; said elastomeric emulsion is present in an amount of 5 percent by weight; said water repellant is a polyurethane dispersion that is present in an amount of 4 percent; and said plasticizer is a polyethylene glycol that is present in an amount of 4 percent by weight.

63. The heat sealable element of claim 44, wherein said Image Receiving Layer does not melt below 260° C.

64. The heat sealable element of claim 44, wherein an adhesive is placed between the support and the heat sealing layer.

65. The heat sealable element of claim 44, wherein the non-porous or smooth support is at least one selected from the group consisting of fabric, paper, metal and plastic.

66. The heat sealable element of claim 44, wherein the heat sealing layer comprises a thermoplastic polymer which melts in a range of from about 65° C. to about 180° C. and has a solubility parameter of at least about 14 $(Mpa)^{1/2}$.

67. The heat sealable element of claim 44, wherein said Image Receiving Layer further comprises an oxidized polyethylene homopolymer.

68. The heat sealable element of claim 44, wherein said Image receiving Layer further comprises an ethylene vinyl acetate copolymer powder.

69. The heat sealable element of claim 53, wherein the Image Receiving Layer comprises an ethylene acrylic acid co-polymer dispersion.

70. The heat sealable element of claim 53, wherein said elastomeric emulsion is at least one selected from the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

71. The heat sealable element of claim 70, wherein the film-forming binder is at least one selected from the group consisting of ethylene-acrylic acid copolymers, polyolefins, and waxes.

72. The heat sealable element of claim 70, further comprising a retention aid which is at least one selected from the group consisting of polyvinyl alcohols, polymer latexes and silicates.

73. The heat sealable element of claim 44, wherein said Image Receiving Layer is present in a dry coat amount of from 1.0 to 10 $g/m^2$.

74. The heat sealable element of claim 44, wherein the heat sealing layer comprises a film-forming binder which melts in the range of from about 65° C. to about 180° C.; a wax dispersion; and a retention aid.

75. The heat sealable element of claim 44, wherein said heat sealing layer is present in a dry coat amount of from 5 to 30 $g/m^2$.

76. The heat sealable element of claim 75, wherein the wax dispersion is at least one selected from the group consisting of natural and synthetic waxes.

77. The heat sealable element of claim 75, wherein the wax is at least one selected from the group consisting of natural and synthetic waxes.

78. The heat sealable element of claim 44, wherein the heat sealing layer has a melting point of at least 650° C. and comprises:
  (i) particles of a thermoplastic polymer having dimensions of about 1 to about 50 micrometers, from about 10 to about 50 weight percent of a film-forming binder, based on the weight of the thermoplastic polymer, and optionally from about 0.2 to about 10 weight percent of a fluid viscosity modifier, based on the weight of the thermoplastic polymer,
  (ii) about 15 to about 80 percent by weight of at least one of a film-forming binder selected from the group consisting of ethylene-acrylic acid copolymers, polyolefins, and waxes and from about 85 to about 20 percent by weight of at least one of a powdered thermoplastic polymer selected from the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts in the range of from about 65° C. to about 180° C. and the powdered thermoplastic polymer consists of particles of about 1 to about 50 micrometers,
  (iii) at least one of a film forming binder selected from the group consisting of ethylene-acrylic acid copolymers having particles of about 1 to about 50 micrometers, polyolefins, and waxes and which melts in the range of from about 65° C. to about 180° C., or
  (iv) a thermoplastic polymer having particles of about 1 to about 50 micrometers selected from at least one of the group consisting of polyolefins, polyesters, ethylene-vinyl acetate copolymers, ethylene-methacrylic acid copolymers, and ethylene-acrylic acid copolymers and which melts in the range of from about 65 to about 180° C.

79. The heat sealable element of claim 44, wherein the heat sealing layer comprises particles of a thermoplastic polymer having dimensions of 1 to 20 micrometers.

80. The heat sealable element of claim 44, wherein the heat sealing layer comprises particles of a thermoplastic polymer having dimensions of about 1 to about 20 micrometers, from about 10 to about 50 weight percent of a film-forming binder, based on the weight of the thermoplastic polymer, and optionally from about 0.2 to about 10 weight percent of a fluid viscosity modifier, based on the weight of the thermoplastic polymer.

81. The heat sealable element of claim 44, wherein the wherein the heat sealing layer melts from about 65 to about 180° C. and comprises particles of a thermoplastic polymer having dimensions of about 1 to about 20 micrometers, from about 10 to about 50 weight percent of a film-forming binder, based on the weight of the thermoplastic polymer, and from about 2 to about 20 weight percent of a cationic polymer, based on the weight of the thermoplastic polymer.

82. The heat sealable element of claim 44, wherein the heat sealing layer comprises from about 15 to about 80 percent by weight of a film-forming binder selected from at least one of the group consisting of ethylene-acrylic acid copolymers, polyolefins, and waxes and from about 85 to about 20 percent by weight of a powdered thermoplastic polymer selected from at least one of the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts in the range of from about 65° C. to about 180° C. and said powdered thermoplastic consists of particles which are from about 1 to about 50 micrometers in diameter.

83. The heat sealable element of claim 44, wherein the heat sealing layer comprises a film forming binder selected from at least one of the group consisting of ethylene-acrylic acid copolymers having particles of about 1 to 20 micrometers, polyolefins, and waxes and which melts in the range of from about 65 to about 180° C.

84. The heat sealable element of claim 44, wherein the heat sealing layer comprises a thermoplastic polymer having particles of about 1 to 20 micrometers selected from at least one of the group consisting of polyolefins, polyesters, and ethylene-vinyl acetate copolymers and which melts in the range of from about 65 to about 180° C.

85. The heat sealable element of claim 44, wherein the heat sealing layer comprises a thermoplastic polymer having particles of about 1 to 50 micrometers selected from at least one of the group consisting of polyolefins, polyesters, and ethylene-vinyl acetate copolymers, ethylene-methacrylic acid copolymers, and ethylene-acrylic acid copolymers and which melts in the range of from about 65 to about 180° C.

86. The heat sealable element of claim 44, wherein the adhesive is selected from at least one of the group consisting of polybutadiene, polybutadiene derivatives, polyurethane, polyurethane derivatives, styrene-butadiene, styrene-butadiene-styrene, acrylonitrile-butadiene, acrylonitrile-butadiene-styrene, acrylonitrile-ethylene-styrene, polyacrylates, polychloroprene, ethylene-vinyl acetate and poly (vinyl chloride).

87. The heat sealable element of claim 64, wherein the adhesive is present in an amount of 0.1–15 g/m$^2$.

88. A non-transferable heat sealable element, which comprises:
  (i) either (a) a porous or absorbent support or (b) a non-porous or smooth support, and
  (ii) a heat sealing layer comprising a thermoplastic polymer which melts in the range of 50–250° C., a wax which melts in the range of 50–250° C., or combinations thereof, and
    when said support is a non-porous or smooth support, said non-transferable heat sealable element further comprises (iii) an Image Receiving Layer which comprises at least one polymer which is capable of receiving and retaining water base colorants, said Image Receiving Layer either does not melt when heat is applied or melts at a temperature above the melting temperature of the heat sealing layer,
    wherein said porous or absorbent support does not have a tack-free surface and which absorbs at least 1% of said heat sealing layer, or said non-porous or smooth support has a surface on which said heat sealing layer is to be coated and which has a surface energy of at least 10 mN/m more than the heat sealing layer, and wherein said non-transferable heat sealable element is non-transferable.

89. A process for heat sealing an image, which comprises: (i) imaging a non-transferable heat sealable element of claim 88 with a water base colorant, and (ii) heating said imaging element in order to melt the heat sealing layer, but not the optional Image Receiving Layer, in order to form a single layer which encapsulates the water base colorant in said single layer.

90. The method of claim 89, wherein said imaging is provided by an electrostatic printer or copier.

91. The method of claim 89, wherein said imaging is provided by offset or screen printing.

92. The method of claim 89, wherein said imaging is provided by craft-type marking.

93. The method of claim 89, wherein said craft-type marking is selected from the group consisting of markers, crayons, paints and pens.

94. The method of claim 89, wherein said imaging is provided by ink jet printing.

95. The method of claim 89, wherein when the heating is applied directly to the surface of the Image Receiving Layer or the Heat Sealing Layer, the process further comprises step (iii) after the imaging step (i) but prior to the heating step (ii), wherein step (iii) comprises positioning a tack free sheet on either the Image Receiving Layer or the Heat Sealing Layer prior to the heating step (ii).

96. The method of claim 89, wherein heating is with an iron, heat press or with laminating rollers.

* * * * *